United States Patent
De Lapersonne et al.

(10) Patent No.: US 10,364,894 B2
(45) Date of Patent: Jul. 30, 2019

(54) SEALING ASSEMBLY AND METHOD FOR THE OPERATION THEREOF

(71) Applicant: Burckhardt Compression AG, Winterthur (CH)

(72) Inventors: Pascal De Lapersonne, Winterthur (CH); Norbert Feistel, Ellikon a.d. Thur (CH); Alexandre Voser, Elsau (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 15/100,641

(22) PCT Filed: Dec. 2, 2014

(86) PCT No.: PCT/EP2014/076304
§ 371 (c)(1),
(2) Date: Jun. 1, 2016

(87) PCT Pub. No.: WO2015/082497
PCT Pub. Date: Jun. 11, 2015

(65) Prior Publication Data
US 2016/0298768 A1    Oct. 13, 2016

(30) Foreign Application Priority Data
Dec. 2, 2013   (EP) ..................................... 13195239

(51) Int. Cl.
*F16J 15/26* (2006.01)
*F16J 15/34* (2006.01)

(52) U.S. Cl.
CPC ........... *F16J 15/26* (2013.01); *F16J 15/3444* (2013.01)

(58) Field of Classification Search
CPC .. F16J 15/26; F16J 15/28; F16J 15/184; F16J 15/186; F16J 15/43; F16J 15/3444; F16C 33/1035
See application file for complete search history.

(56) References Cited

U.S. PATENT DOCUMENTS 1,928,448 A * 9/1933 Fox .......................... F16J 15/26
184/24
2,914,348 A * 11/1959 Kroekel ................... F16J 15/26
277/548

(Continued)

FOREIGN PATENT DOCUMENTS

| AT | 508782 A4 | 4/2011 | |
|---|---|---|---|
| GB | 141821 A | 4/1920 | |
| JP | 2011163559 A * | 8/2011 | ............... F16J 15/24 |

OTHER PUBLICATIONS

International Application PCT/EP2014/076304 Search Report dated Mar. 26, 2015 (3 pages) and translation thereof (2 pages).

(Continued)

*Primary Examiner* — Eugene G Byrd
(74) *Attorney, Agent, or Firm* — Vladimir Sherman (57) ABSTRACT

The invention relates to a sealing assembly (1) for sealing a piston rod (2) of a piston compressor, which piston rod extends in an axial direction (A) and can be moved back and forth in the axial direction (A). Said sealing assembly (1) comprises at least one packing chamber (4), wherein the packing chamber (4) is bounded in the axial direction (A) by a first and a second side wall (5, 6), wherein at least one sealing ring (7) or one scraping ring (8) and a spring device (9) are arranged in the packing chamber (4), and wherein a spring device (9) and at least one sealing ring (7) or one scraping ring (8) are arranged one after the other in the axial direction (A) proceeding from the first side wall (5), wherein the sealing ring (7) or the scraping ring (8) lies against the (Continued)

second side wall (6), and wherein the spring device (9) is designed as a magnetic spring and consists of two assemblies (9*a*, 9*b*) spaced apart in the axial direction (A), a first assembly (9*a*) and a second assembly (9*b*), wherein each assembly (9*a*, 9*b*) comprises at least one magnet (10*a*, 10*b*), and wherein the magnets (10*a*, 10*b*) are arranged in the two assemblies (9*a*, 9*b*) in a mutually matched manner in such a way that the two assemblies (9*a*, 9*b*) repel each other.

19 Claims, 6 Drawing Sheets

(56) References Cited

U.S. PATENT DOCUMENTS

| | | | | |
|---|---|---|---|---|
| 3,050,311 | A * | 8/1962 | Mikell | F16J 15/26 |
| | | | | 277/581 |
| 3,235,275 | A * | 2/1966 | Hart | F16J 15/26 |
| | | | | 277/546 |
| 4,434,987 | A * | 3/1984 | Albers | F16J 15/342 |
| | | | | 277/317 |
| 4,447,063 | A * | 5/1984 | Kotzur | F16J 15/342 |
| | | | | 277/304 |
| 4,486,026 | A * | 12/1984 | Furumura | F16C 17/107 |
| | | | | 277/348 |
| 5,137,286 | A * | 8/1992 | Whitford | F16J 15/441 |
| | | | | 277/410 |
| 5,161,804 | A | 11/1992 | Orlowski et al. | |
| 5,865,441 | A * | 2/1999 | Orlowski | F16J 15/3404 |
| | | | | 277/364 |
| 6,367,808 | B1 * | 4/2002 | Feistel | F16J 9/16 |
| | | | | 277/459 |
| 6,572,113 | B2 * | 6/2003 | Care | B25B 27/0028 |
| | | | | 277/378 |
| 7,100,923 | B2 * | 9/2006 | Anzai | F16J 15/43 |
| | | | | 277/410 |
| 7,815,193 | B2 * | 10/2010 | Feistel | F04B 39/041 |
| | | | | 277/303 |
| 7,815,196 | B2 * | 10/2010 | Deshpande | F16J 15/54 |
| | | | | 277/410 |
| 8,038,155 | B2 * | 10/2011 | Zheng | F16J 15/3444 |
| | | | | 277/302 |
| 8,191,460 | B2 * | 6/2012 | Tackett, Jr. | F04B 15/04 |
| | | | | 277/926 |
| 8,419,019 | B2 * | 4/2013 | Kung | F04D 29/102 |
| | | | | 277/410 |
| 9,234,479 | B2 * | 1/2016 | Feistel | F16J 9/062 |

OTHER PUBLICATIONS

International Application PCT/EP2014/076304 Patentability Report dated Mar. 26, 2015 (5 pages).

* cited by examiner

SEALING ASSEMBLY AND METHOD FOR THE OPERATION THEREOF

DESCRIPTION

The invention relates to a sealing assembly for sealing a piston rod of a piston compressor, which piston rod extends in an axial direction and can be moved back and forth in the axial direction. The invention further relates to a method for the operation of the sealing assembly.

PRIOR ART

Piston compressors are working machines which are used for conveying and compressing gases up to high pressures of any kind. Such piston compressors operate on the displacement body principle, that is the compression chamber closes completely after the suction intake of the gas. The volume in a cylinder is reduced through the application of a force and the gas is compressed. A piston compressor of this kind, also called here a crosshead piston compressor, comprises a piston rod which can be moved linearly back and forth and which is connected on one side to a piston and on the other side to a crosshead or a crank drive. In order to seal off the high pressure difference between the piston and crank drive a pressure packing with chamber discs is arranged along the piston rod. A pressure packing of this kind comprises at least one packing ring, configured as a sealing ring or a scraping ring. Normally a pressure packing of this kind towards the crank drive side comprises at least one scraping ring in order to scrape off any oil from the crank drive, such as for example lubricating oil, adhering to the piston rod.

The printed specification AT 512 609 discloses a pressure packing with chamber discs, wherein each chamber disc forms a packing chamber, and wherein at least one packing ring, configured as a scraping ring or as a sealing ring, is arranged in at least one of the packing chambers and serves to scrape off oil adhering to the piston rod. The packing ring is pretensioned via a spring element in the axial direction in order to prevent the formation of a leakage path between the packing ring and a boundary surface of the chamber disc. The arrangement of a packing ring as disclosed in the printed specification AT 512 609 in combination with a spring element has the drawback that with each stroke of the piston rod the packing ring has an axial play so that a radial gap is opened up between the packing ring and the boundary surface of the chamber disc, which is adjoined at times by the packing ring, so that oil can pass unhindered through this radial gap out from the crankcase or gearbox into the packing chamber. The scraping ring is moreover subjected to a higher wear so that this has to be replaced at shorter maintenance intervals.

The printed specification AT 508 782 A4 discloses an assembly of two packing rings in combination with a spring element. This assembly has the drawback that as a result of the axial play of the packing rings, a radial gap can open between the two packing rings and/or between the packing ring and the boundary surface of the chamber disc whereby oil can pass through the gap unhindered from the piston rod or from the crankcase into the packing chamber. The packing ring is also subject to higher wear so that this has to be replaced at shorter maintenance intervals.

The printed specification U.S. Pat. No. 5,558,341 discloses a sealing device for a non-compressible fluid. This sealing device is suitable for sealing a rotating shaft. A sealing device of this kind is however not suitable for sealing a shaft which executes a lifting movement in the axial direction.

PRESENTATION OF THE INVENTION

The object of the invention is to provide a more advantageous sealing assembly which is less likely to form a radial gap, and which moreover has less wear.

This is achieved with a sealing assembly comprising the features of claim 1. The dependent claims 2 to 16 relate to further advantageous configurations. The object is further achieved with a method for operating a sealing assembly comprising the features of claim 17. The dependent claims 18 and 19 relate to further advantageous method steps.

The object is achieved in particular with a sealing assembly for sealing a piston rod of a piston compressor, which piston rod extends in an axial direction and can be moved back and forth in the axial direction, said sealing assembly comprising at least one packing chamber, wherein the packing chamber is bounded in the axial direction by a first and a second side wall, wherein at least one packing ring, configured as a sealing ring or a scraping ring, as well as a spring device are arranged in the packing chamber, and wherein a spring device and at least one packing ring are arranged in succession one after the other in the axial direction proceeding from the first side wall, wherein the packing ring lies against the second side wall, and wherein the spring device is configured as a magnetic spring and consists of two assemblies spaced apart in the axial direction, a first assembly and a second assembly, wherein each assembly comprises at least one magnet, and wherein the magnets are arranged in the two assemblies in a mutually matched manner in such a way that the two assemblies repel each other.

The object is further achieved in particular with a method for operating a sealing assembly for sealing a piston rod of a piston compressor, which piston rod extends in an axial direction and can be moved back and forth in the axial direction, wherein the sealing assembly comprises at least one packing chamber, and wherein a magnetic spring device, comprising an electromagnet and at least one packing ring, is arranged in succession in the axial direction in the packing chamber, wherein a state variable of the piston compressor is measured and wherein the electromagnet is controlled in dependence on the state variable in order to change the spring force, which is applied by the magnetic spring device on the packing ring, in dependence on the state variable.

It has been shown that the axial play, or the radial gap, which is formed between the packing ring and the boundary surface of the chamber disc or between two packing rings arranged next to one another, can be reduced by increasing the spring force. Increasing the spring force however has the result that the movement of the packing rings in the radial direction, that is radially to the moving direction of the piston rod, is reduced or prevented if the mutual contact pressure force between the packing ring and the boundary surface of the chamber disc or between two packing rings is too great. This has the result that the packing rings are held in an eccentric position relative to the piston rod which results in increased wear on the packing rings and also an increased leakage from the packing rings. The use of a magnetic spring has the advantage that the latter has a non-linear spring characteristic. The spring force of the magnetic spring is more advantageously selected such that a movement of the packing rings in the radial direction is possible, and that the spring force rises non-linearly, that is over-proportionally, when an axial play or a displacement in the axial direction occurs between the packing ring and the boundary surface of the chamber disc or between two packing rings. This non-linear spring characteristic has the result that the axial play is reduced or prevented whilst movement of the packing rings in the radial direction is possible at least partially. The sealing assembly according to the invention therefore has the advantage that it is less likely to form a radial gap, and that the packing rings have less wear and a higher sealing tightness. The magnetic spring furthermore has the advantage that it has a low wear.

In a particularly advantageous embodiment the magnets are configured as permanent magnets. This embodiment has the advantage that the spring device can be configured particularly cost-effectively and reliably. In a further advantageous embodiment the magnets of two assemblies are formed as electromagnets. In a further possible embodiment the magnet of one assembly is formed as a permanent magnet and the magnet of the other assembly is formed as an electromagnet. The embodiment of the spring device comprising at least one electromagnet has the advantage that the spring force applied by the spring device is controllable, through a corresponding magnetization of the electromagnets. The spring force required in the sealing assembly depends in particular on the rotational speed or stroke frequency of the piston compressor. In an advantageous configuration a regulating device is thus provided which regulates the spring force in dependence on the rotational speed of the piston compressor.

The sealing assembly according to the invention has inter alia the advantage that the spring device suffers no wear. Thus there is no wear and tear and the spring device need not or hardly ever be replaced. This reduces the maintenance costs and increases the reliability of the sealing assembly. The spring device which is configured as a magnetic spring furthermore has the advantage that the magnetic spring has a non-linear force-path characteristic line. This means that the repelling force of two spaced assemblies of magnetic springs increases very rapidly, that is non-linearly, as the spacing decreases. A small reduction in the spacing of the air gap of by way of example half a millimeter can thus in some circumstances increase the repelling force by half. This spring characteristic of the magnetic spring has the result that a sealing ring or a scraping ring, which has left its proposed position as a result of the axial play through a displacement in the axial direction, is brought very rapidly back again into the corrected original position, so that the sealing ring or the scraping ring arranged towards the side wall very rapidly lies again against the second side wall. This has the result that the wear on the sealing ring or the scraping ring and the leakage of the sealing ring or scraping ring are reduced since these are mainly held in the position intended for them. This likewise reduces the maintenance costs and increases the reliability of the sealing assembly.

SHORT DESCRIPTION OF THE DRAWINGS

In the drawings used for explaining the embodiment.

In principle the same parts are provided with the same reference numerals in the drawings.

WAYS FOR IMPLEMENTING THE INVENTION

Figure 1:
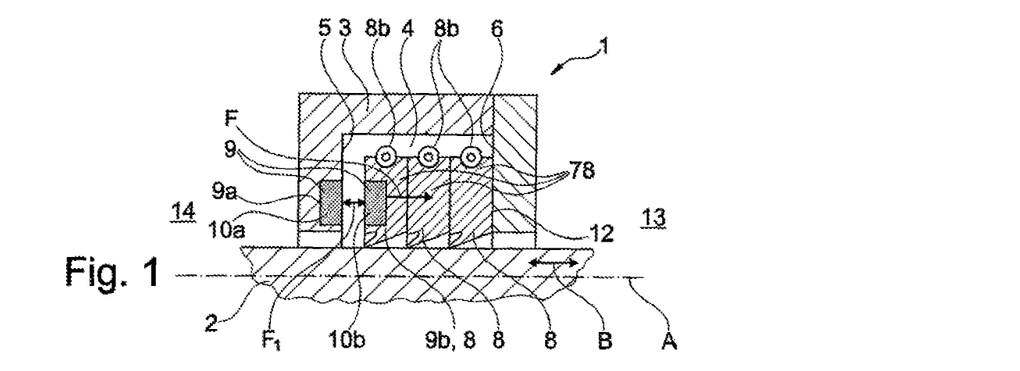
FIG. 1 shows a longitudinal sectional view through a first exemplary embodiment of a sealing assembly.
Figure 10:
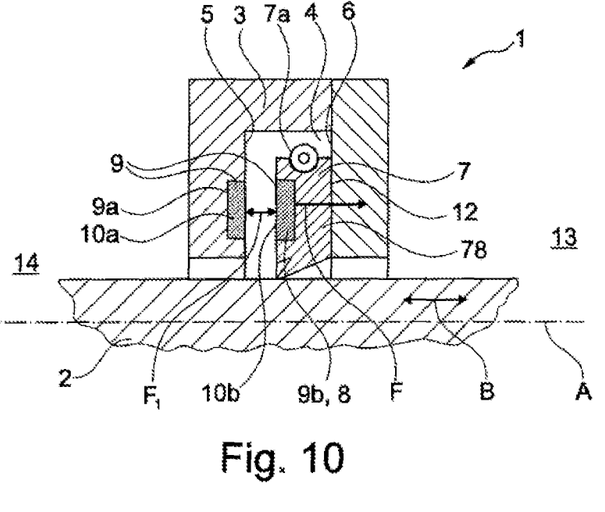
FIG. 10 shows a longitudinal sectional view through a fifth exemplary embodiment of a sealing assembly.
Figure 12:
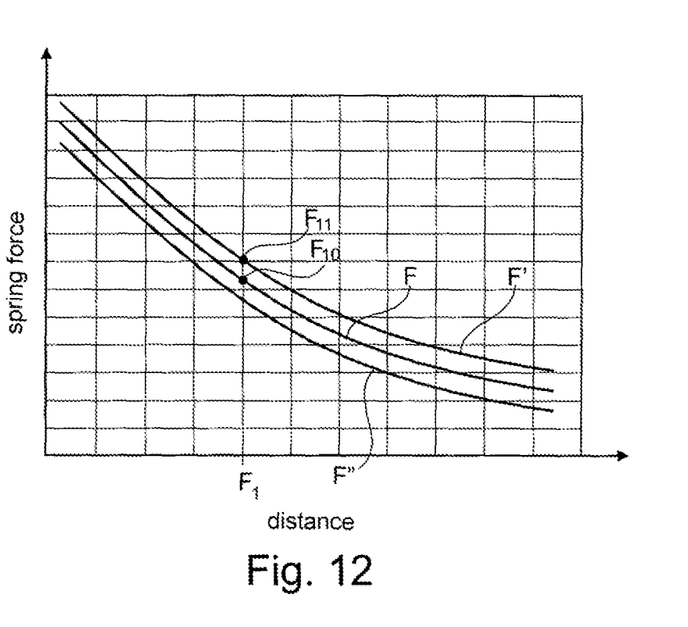
FIG. 12 shows a spring characteristic.

FIGS. 1 to 4 as well as FIG. 10 each show a longitudinal sectional view through different sealing assemblies 1 for sealing a piston rod 2 of a piston compressor which extends in the axial direction A and can move in the direction of movement B. The sealing assembly 1 comprises a chamber disc 3 or a packing housing 3 which forms a packing chamber 4 or a recess, wherein the packing chamber 4 is bounded in the axial direction A by a first and a second side wall 5, 6. The first side wall 5 is arranged closer to the cylinder chamber 14, whilst the second side wall 6 is arranged closer to the crankcase 13 or to the gearbox. A spring device 9 is arranged in the packing chamber 4 and additionally either at least one packing ring, configured as a scraping ring 8, as shown in FIG. 1, or configured as a sealing ring 7, as shown in FIG. 2 to 4 or 10. The scraping ring 8 serves in particular for scraping off oil which has accumulated on the surface of the piston rod 2. The sealing ring 8 serves in particular to seal off and/or scrape off any existing gas cloud. Starting from the first side wall 5 first the spring device 9 and then at least one scraping ring 8 or a sealing ring 7 are arranged one after the other in the axial direction A, wherein the sealing ring 7 or the scraping ring 8 lies against the second side wall 6. The spring device 9 is configured as a magnetic spring and consists of two assemblies 9a, 9b arranged spaced out in the axial direction A, namely a first assembly 9a and a second assembly 9b, wherein each assembly 9a, 9b comprises at least one magnet 10a, 10b, and wherein the magnets 10a, 10b are arranged in mutually matched manner in the two assemblies 9a, 9b such that the two assemblies 9a, 9b repel each other in that a mutually repelling force F acts between the two magnets 10a, 10b, which are spaced from one another by the distance F1, so that a spring force F acts on the scraping ring 8 or the sealing ring 7 respectively. FIG. 12 shows by way of example the connection of the spring force F as a function of the distance F1 of a spring device 9 such as is illustrated in FIG. 1 to 4 or 10.

Figure 5:
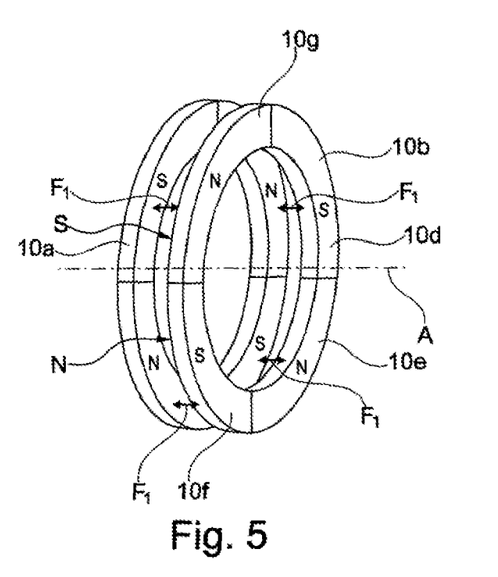
FIG. 5 shows a perspective view of two permanent magnets.
Figure 6:
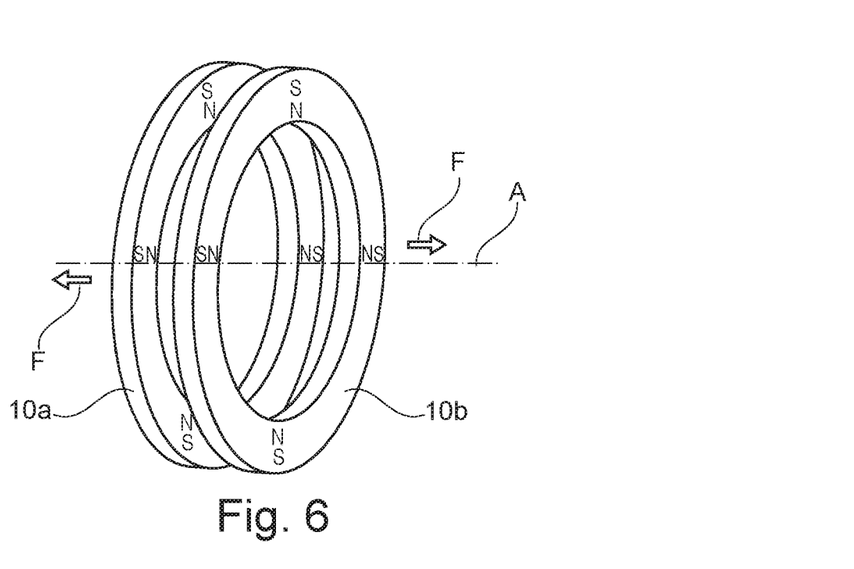
FIG. 6 shows a perspective view of two further permanent magnets.

In a preferred configuration the magnets 10a, 10b are configured as permanent magnets, as shown in FIGS. 5 and 6, wherein the polarization of the permanent magnets is marked by N and S. FIG. 5 shows two circulating permanent magnets 10a, 10b, with four permanent magnet parts 10d, 10e, 10f, 10g, arranged spread out in the circumferential direction, wherein the polarization of the magnets runs in the running direction of the axis A, and wherein each two circumferentially adjacent permanent magnet parts 10d, 10e, 10f, 10g have an opposing polarization, such as is shown in the circumferential direction with the polarization N-S-N-S. The permanent magnet parts 10d, 10e, 10f, 10g are arranged in a mutually matched manner in the magnets 10a, 10b so that the magnets 10a, 10b repel each other in the axial direction A, because the end sides of the opposing permanent magnet parts 10d, 10e, 10f, 10g have the same polarization N-N or S-S in the axial direction A.

FIG. 6 shows two circular running permanent magnets 10a, 10b, which preferably each comprise one piece wherein the polarization of the magnets 10a, 10b runs in the radial direction, that is radially to the axis A. The permanent magnets 10a, 10b are arranged in a mutually matched manner in such a way that the magnets 10a, 10b repel each other in the axial direction A.

Figure 8:
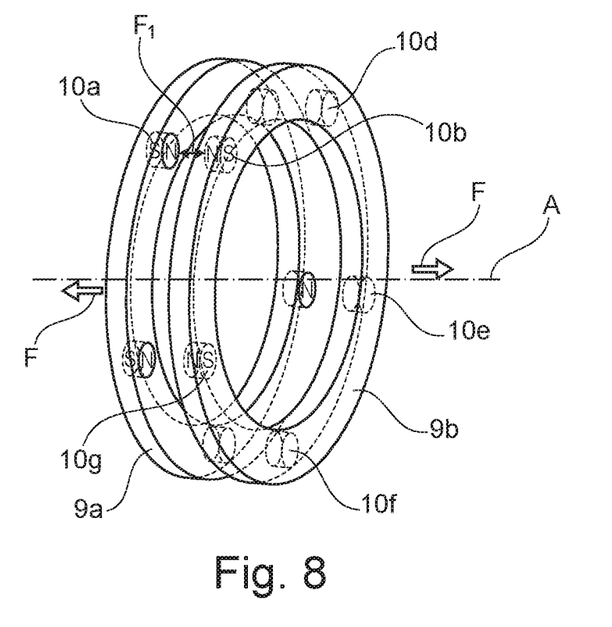
FIG. 8 shows a perspective view of two assemblies.

FIG. 8 shows two circular running assemblies 9a, 9b, a first assembly 9a and a second assembly 9b, in which permanent magnet parts 10d, 10e, 10f, 10g are arranged mutually spaced from one another in the circumferential direction, wherein the permanent magnet parts 10d, 10e, 10f, 10g are polarized in the running direction of the axis A. Each two permanent magnet parts 10d, 10e, 10f, 10g which are arranged circumferentially adjacent have an opposite polarization. The permanent magnet parts 10d, 10e, 10f, 10g are arranged in a mutually matched manner in the first and second assembly 9a, 9b respectively so that the magnets 10a, 10b and the assemblies 9a, 9b respectively repel each other in the axial direction A.

Figure 9:
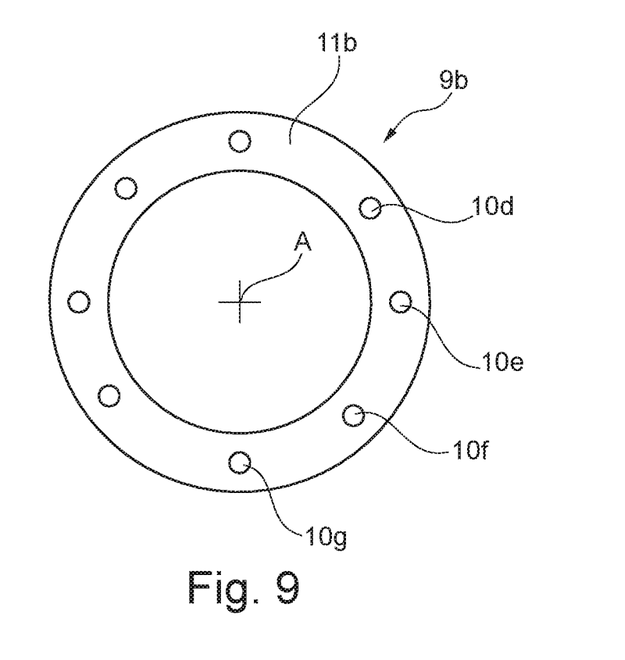
FIG. 9 shows a plan view of a further exemplary embodiment of an assembly.

FIG. 9 shows in a plan view a further exemplary embodiment of a possible assembly 9b having a ring-shaped magnet carrier 11b with eight permanent magnet parts 10d, 10e, 10f, 10g arranged mutually spaced in the circumferential direction, and of which four are provided with reference numerals.

Assemblies 9a, 9b, such as those illustrated in FIGS. 5, 6, 8 and 9, can be arranged in different ways in the sealing assembly 1, as illustrated in FIG. 1 to 4 or 10. An arrangement of this kind could have by way of example the spring characteristic illustrated in FIG. 12.

The sealing assembly 1 illustrated in FIG. 1 comprises three scraping rings 8 arranged next to one another in the axial direction A, wherein the first assembly 9a is arranged in the first side wall 5 in the packing housing 3 and wherein the second assembly 9b is arranged in the scraping ring 8, so that a repelling spring force F is produced by the two permanent magnets 10a, 10b and presses the scraping rings 8 in the direction of the spring force F against the sealing surface 12. The two assemblies 9a, 9b form the magnetic spring device 9. In this exemplary embodiment at least that scraping ring 8 in which the second assembly 9b is arranged, consists of a non-ferromagnetic material. The first side wall 5 is moreover made from a non-ferromagnetic material. The scraping rings 8 which are not shown in detail are enclosed by a tubular spring 8b.

Figure 2:
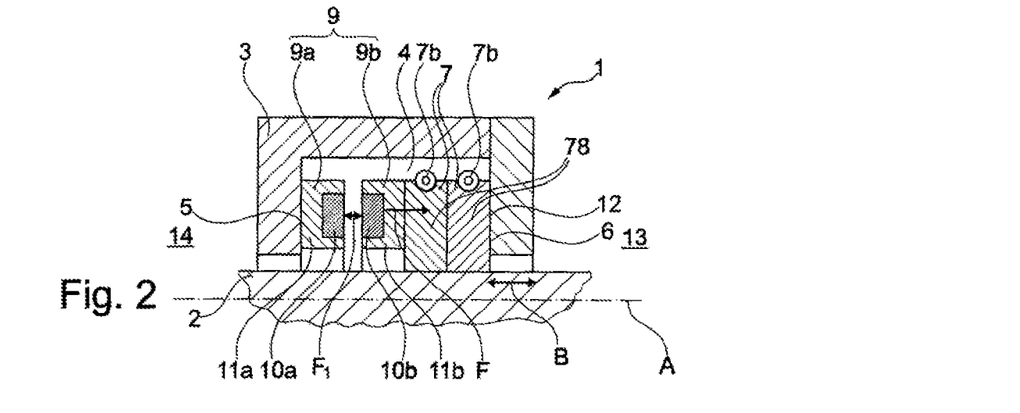
FIG. 2 shows a longitudinal sectional view through a second exemplary embodiment of a sealing assembly.
Figure 7:
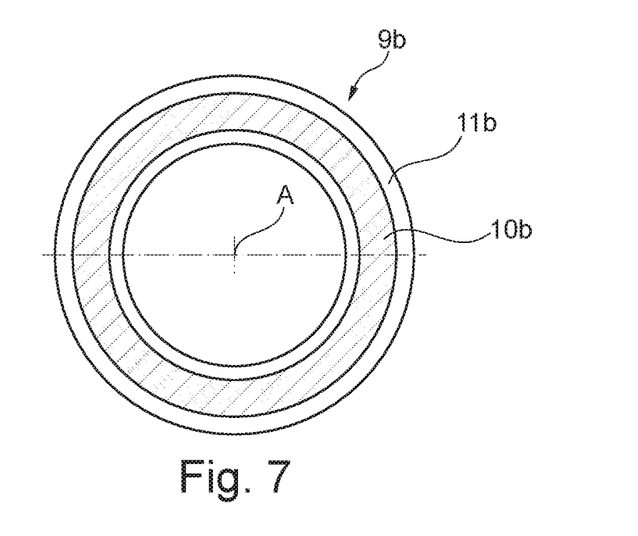
FIG. 7 shows a plan view of an assembly comprising a magnet carrier.

The sealing assembly 1 illustrated in FIG. 2 comprises two sealing rings 7 arranged next to one another in the axial direction A, and further comprises two assemblies 9a, 9b arranged next to one another in the axial direction A, wherein each assembly 9a, 9b comprises a ring-shaped magnet carrier 11a, 11b, and a permanent magnet 10a, 10b arranged therein. The first assembly 9a lies against the first side wall 5 in the packing housing 3, whilst the second assembly 9b lies against a sealing ring 7, so that the second assembly 9b applies a spring force F on the sealing rings 7, which force presses the sealing ring 7 in the direction of the spring force F against the sealing surface 12. The ring-shaped magnet carriers 11a, 11b consist of a non-ferromagnetic material. FIG. 7 shows a plan view of the second assembly illustrated in FIG. 2, with the ring-shaped magnet carrier 11b and the permanent magnet 10b. The sealing rings 7 which are not shown in detail are enclosed by a tubular spring 7b.

Figure 3:
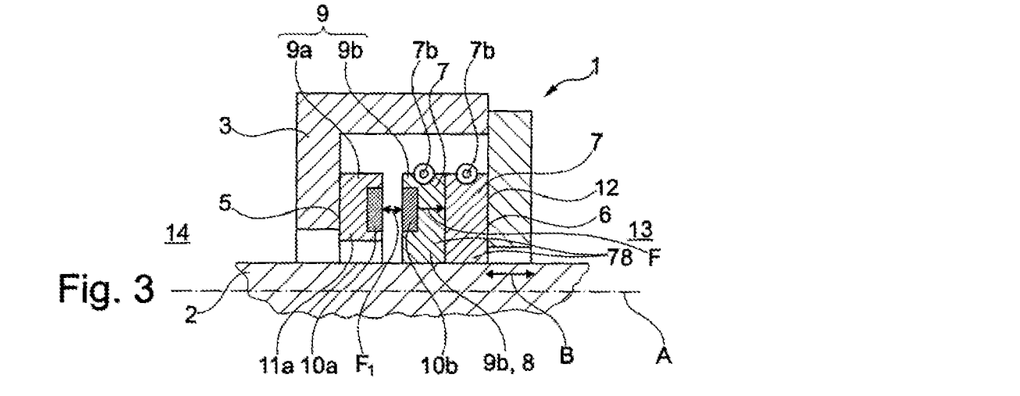
FIG. 3 shows a longitudinal sectional view through a third exemplary embodiment of a sealing assembly.

The sealing assembly 1 illustrated in FIG. 3 comprises two sealing rings 7, which are arranged next to one another in the axial direction A, and comprises a first assembly 9a with ring-shaped magnet carrier 11a and permanent magnet 10a, arranged spaced out in the axial direction A. The second assembly 9b is formed by a combination of the sealing ring 7 with a permanent magnet 10b. The first assembly 9a lies against the first side wall 5 in the packing housing 3, whilst the second assembly 9b forms part of the sealing ring 7 and lies against a further sealing ring 7, so that the second assembly 9b applies a spring force F on the sealing rings 7, which presses the sealing ring 7 in the direction of the spring force F against the sealing surface 12. The ring-shaped magnet carriers 11a and the sealing ring 7 comprising the second assembly 9b consist of a non-ferromagnetic material.

Figure 4:
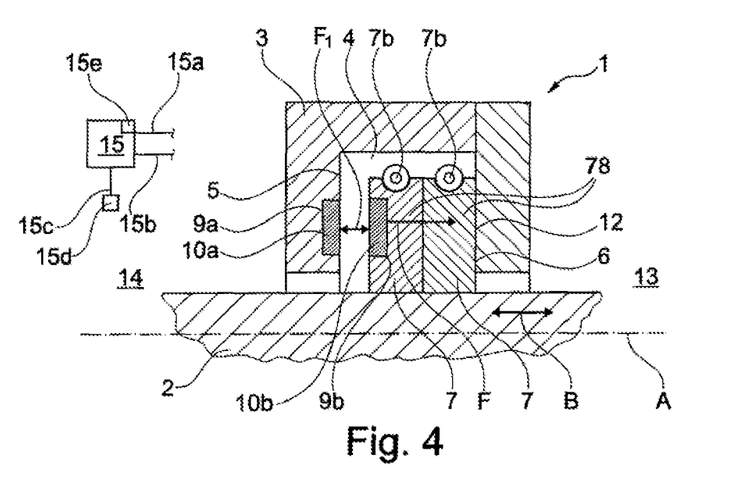
FIG. 4 shows a longitudinal sectional view though a fourth exemplary embodiment of a sealing assembly.

The sealing assembly 1 illustrated in FIG. 4 comprises two sealing rings 7, which are arranged next to one another in the axial direction A, and comprises a spring device 9 with a first assembly 9a and a second assembly 9b. The first assembly 9a is arranged in the first side wall 5 of the packing housing 3. The second assembly 9b is formed by a combination of the sealing ring 7 with a permanent magnet 10b. The second assembly 9b applies a spring force F on the sealing rings 7 which presses the sealing ring 7, arranged on the right, in the direction of the spring force F against the sealing surface 12. The packing housing 3 and the sealing ring 7 comprising the second assembly 9b consist of a non-ferromagnetic material.

The sealing assembly 1 illustrated in FIG. 10 comprises a single sealing ring 7, and comprises a spring device 9 with a first assembly 9a and a second assembly 9b. The first assembly 9a is arranged in the first side wall 5 of the packing housing 3. The second assembly 9b is formed by a combination of the sealing ring 7 with a permanent magnet 10b. The second assembly 9b applies a spring force F on the sealing rings 7 which presses the sealing ring 7, arranged on the right, in the direction of the spring force F against the sealing surface 12. The packing housing 3 and the sealing ring 7, comprising the second assembly 9b, consist of a non-ferromagnetic material.

Figure 11:
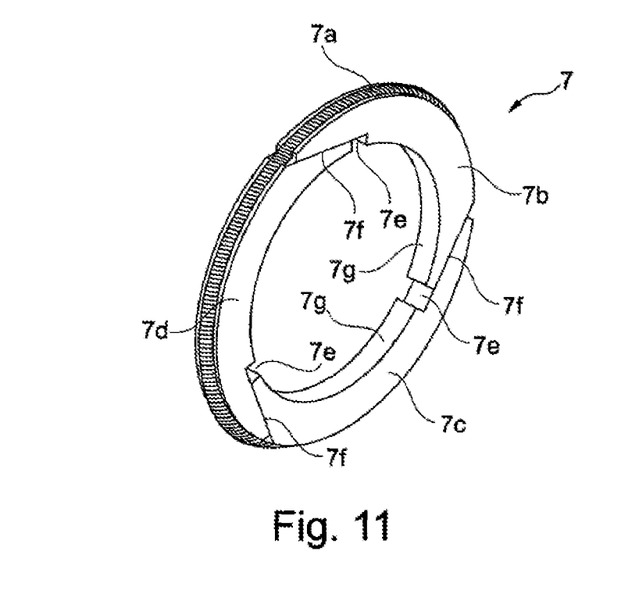
FIG. 11 shows a perspective view of a sealing ring.

FIG. 11 shows by way of example a sealing ring 7, which comprises a first, a second and a third segment part 7b, 7c, 7d, and which is enclosed by a tubular spring 7a. The three segment parts 7b, 7c, 7d are mounted to be mutually displaceable via joints 7f and each have one joint 7e. The spring force of the tubular spring 7a has the result that the sealing surfaces 7g towards the piston rod 2 have a pretension and are pressed towards the piston rod 2.

The sealing assembly 1 illustrated in FIG. 2 could have by way of example two sealing rings 7 each, as illustrated in FIG. 11. If the spring force F applied by the spring device 9 is too great then this can have the result that the movement of the segment parts 7b, 7c, 7d of the sealing ring 7 is impended or prevented so that the sealing ring 7 bears asymmetrically, or even not at all, against the piston rod 2, which results in increased wear, asymmetric wear or increased untightness. In FIG. 2 the spring device 9 has a mutual spacing F1. FIG. 12 shows the spring force in the case of the spacing F1. The non-linear path of the spring force F has the advantage that the spring force is relatively low in the case of the spacing F1, so that a mutual movement of the segment parts 7b, 7c, 7d of the sealing ring 7 is not impeded. As soon as the sealing rings 7 are displaced as a result of the movement B in the axial direction A, this has the result that the spacing F1 is reduced, which as is apparent from FIG. 12, has the result that the spring force F acting on the sealing rings 7 rises over-proportionally, so that only a small radial gap is formed between the two sealing rings 7 or between the sealing ring 7 and the second side wall 6, and the two sealing rings 7 as a result of the increased spring force F move back again into the position illustrated in FIG. 2. The sealing assembly 1 according to the invention therefore has the advantage that the formation or at least the width of the radial gaps between the two sealing rings 7 or between the sealing ring 7 and the second side wall 6 is reduced, and that the radial movement of the sealing ring 7 is not or only slightly impeded.

A sealing ring 7 can be configured in a number of possible ways, in particular can also be in one piece. A scraping ring 8 can also be configured in a number of possible ways, in particular in segmented form or also in one piece.

With the sealing assembly 1 illustrated in FIG. 4, the magnet 10a of the first assembly 9a is formed as an electromagnet and the magnet 10b of the second assembly 9b is formed as a permanent magnet. In further possible embodiments at least one of the magnets 10a, 10b of the first and second assembly 9a, 9b, and preferably both magnets 10a, 10b are formed as electromagnets, so that the magnetic action is produced by a current flowing in the electromagnet. In one possible configuration a constant current flows through the electromagnet in order to thereby achieve a corresponding constant magnetic action. In a particularly advantageous configuration the sealing assembly 1 comprises a regulating device 15 comprising a first control lead 15a for the first assembly 9a and/or comprising a second control lead 15b for the second assembly 9b, as well as comprising a lead 15c for a sensor 15d. The sensor 15d is used by way of example to measure the spring force F or by way of example the spacing F1 between the first and second assembly 9a, 9b, or some other state variable such as the rotational speed of the piston compressor or the stroke of the piston rod 2. The electromagnets 10a, 10b of the first and/or second assembly 9a, 9b are more advantageously controlled so that a predetermined ideal value is observed, e.g. an ideal value for the spring force F or the spacing F1 between the two assemblies 9a, 9b. In one advantageous configuration the spring force F is controlled in dependence on speed, so that the rotational speed or by way of example the movement of the piston rod 2 is detected by an additional sensor, and the spring force F actuated by the spring device 9 is controlled in dependence on the rotational speed.

An exemplary embodiment of this type of regulation will now be described in detail. With the sealing assembly illustrated in FIG. 4 it is assumed that the magnet 10a of the first assembly 9a is an electromagnet and the magnet 10b of the second assembly 9b is a permanent magnet. The electromagnet 10a is supplied with current by the regulating device 15 as well as the control device 15e via the control lead 15a. The rotational speed of the piston compressor is measured with a sensor 15d, and its signal is supplied to the regulating device 15 via the lead 15c. The current in the electromagnet 10a or the magnetic field generated by the electromagnet 10a is increased with increasing speed, or is reduced with decreasing speed. The spring characteristic of the spring device 9 is thereby changed. As shown in FIG. 12, increasing the magnetic field of the electromagnet 10a has the result that the spring characteristic F' is displaced upwards, whilst a reduction in the magnetic field has the result that the spring characteristic F" is displaced downwards. An increase in the rotational speed of the piston compressor has the result that the forces acting in the axial direction A on the sealing rings 7 are increased. In order to counteract a displacement of the sealing rings 7 in the axial direction A, the spring characteristic is raised such as is illustrated with F', which has the result that the spring force acting in the case of the spacing F1 is raised from value F10 to value F11. With a decreasing speed of the piston compressor the current in the electromagnet 10a is reduced so that the spring characteristic again has the path F from a certain speed, and the spring force has the value F10 at the spacing F1.

The sealing assembly 1 illustrated in FIG. 4 comprises at least one packing chamber, and comprises a magnetic spring device 9, comprising an electromagnet 10a and at least one packing ring 78 arranged one after the other in the axial direction A in the packing chamber 4, wherein a state variable of the piston compressor is measured and wherein the electromagnet 10a is controlled in dependence on the state variable, in order to change the spring force F applied by the magnetic spring device 9 on the packing ring 78, in dependence on the state variable.

The rotational speed of the piston compressor, for example, is measured as state variable, wherein the spring force F is increased as the speed increases and is reduced as the speed decreases. The speed of the piston 2 can also be measured by way of example as the state variable.

FIGS. 1 to 4 and 10 each show a sealing assembly 1 with a single chamber disc 3. A sealing assembly 1 can however also be configured in such a way that it has a plurality of chamber discs 3 arranged one after the other in the axial direction A, wherein preferably a spring device 9 as well as at least one packing ring 78 is arranged in each chamber disc 3.

The invention claimed is:

1. A sealing assembly (1) for sealing a piston rod (2) of a piston compressor, which piston rod extends in an axial direction (A) and can be moved back and forth in the axial direction (A), said sealing assembly comprising at least one packing chamber (4) wherein the packing chamber (4) is bounded in the axial direction (A) by a first and a second side wall (5, 6) and radially by a cylindrically shaped housing (3) with a given inner radius, wherein at least one packing ring (78), configured as a sealing ring (7) or as a scraping ring (8), as well as a spring device (9) are arranged in the packing chamber (4), and wherein a spring device (9) and at least one packing ring (78) are arranged one after the other in the axial direction (A) proceeding from the first side wall (5), wherein the packing ring (78) lies against the second side wall (6), characterized in that the spring device (9) is configured as a magnetic spring and consists of two assemblies (9a, 9b) spaced apart in the axial direction (A), a first assembly (9a) and a second assembly (b), wherein each assembly (9a, 9b) comprises at least one magnet (10a, 10b), and wherein the magnets (10a, 10b) are arranged in the two assemblies (9a, 9b) in a mutually matched manner in such a way that the two assemblies (9a, 9b) repel each other, and wherein at least one of the two assemblies (9a, 9b)) is comprised of slideably interlaced ring segments inwardly biased by a spring element, and said at least one assembly has an outer radius smaller than the given inner radius of said cylindrically shaped housing such that it is elastically expandable radially outwards when said piston rod applies a radial force onto said at least one assembly.

2. The sealing assembly as claimed in claim 1, characterized in that it comprises at least two packing rings (78) arranged adjoining one another in the axial direction (A).

3. The sealing assembly as claimed in claim 1, characterized in that the magnets (10a, 10b) are configured as permanent magnets.

4. The sealing assembly as claimed in claim 1, characterized in that at least one of the magnets (10a, 10b) is configured as an electromagnet.

5. The sealing assembly as claimed in claim 1, characterized in that the packing ring (78) furthermore comprises the second assembly (9b), with a magnet (10b) being arranged in the packing ring (78), and that the packing ring (78) is made from a non-ferromagnetic material.

6. The sealing assembly as claimed in claim 1, characterized in that at least one magnet (10a) is arranged in the first side wall (5) of a chamber disc (3) in such a way that the chamber disc (3) encloses the first assembly (9a), and that the chamber disc (3) consists of a non-ferromagnetic material.

7. The sealing assembly as claimed in claim 1, characterized in that the first assembly (9a) encloses a ring-shaped magnet carrier (11a) in which at least one magnet (10a) is arranged, that the ring-shaped magnet carrier (11a) is arranged in the packing chamber (4), that the ring-shaped magnet carrier (11a) is in contact with a first side wall (5), and that the ring-shaped magnet carrier (11a) consists of a non-ferromagnetic material.

8. The sealing assembly as claimed in claim 6, characterized in that the second assembly (9b) encloses a ring-shaped magnet carrier (11b) in which at least one magnet (10b) is arranged, that the ring-shaped magnet carrier (11b) is arranged in the packing chamber (4), that the ring-shaped magnet carrier (11b) is in contact with the packing ring (78), and that the ring-shaped magnet carrier (11b) consists of a non-ferromagnetic material.

9. The sealing assembly as claimed in claim 1, characterized in that the magnet (10a, 10b) is a permanent magnet, has a ring-shaped configuration and extends over 360° in the circumferential direction (10c).

10. The sealing assembly as claimed in claim 9, characterized in that the permanent magnet (10a, 10b) is magnetized in the radial direction.

11. The sealing assembly as claimed in claim 9, characterized in that the permanent magnet (10a, 10b) is magnetized in the axial direction.

12. The sealing assembly as claimed in claim 9, characterized in that the permanent magnet (10a, 10b) is configured in one piece.

13. The sealing assembly as claimed in claim 9, characterized in that the permanent magnet (10a, 10b) consists in the circumferential direction (10c) of a plurality of permanent magnet parts (10d, 10e, 10f, 10g) arranged one after the other in the circumferential direction (10c).

14. The sealing assembly as claimed in claim 13, characterized in that the permanent magnet parts (10d, 10e, 10f, 10g) which are arranged one after the other are magnetized in the opposite direction.

15. The sealing assembly as claimed in-claim 1, characterized in that the magnets (10a, 10b) are configured as permanent magnets, that each assembly (9a, 9b) comprises a plurality of permanent magnets (10a, 10b), that the permanent magnets (10a, 10b) are arranged spaced apart in the circumferential direction (10c) in a mutually matched manner in such a way that the permanent magnets (10a, 10b) of the first and the second assembly (9a, 9b) are arranged opposite one another in the axial direction (A), that the permanent magnets (10a, 10b) are magnetized in the axial direction (A), and that permanent magnets (10a, 10b) arranged opposite one another in the axial direction (A) are magnetized in the opposite direction.

16. The sealing assembly as claimed in claim 4, comprising a regulating device (15) as well as a sensor (15d) for detecting a state variable of a piston compressor, as well as comprising a control device (15e) for controlling the magnet (10a) which is configured as an electromagnet, in order to change the spring force (F) of the spring device (9) in dependence on a measured state variable.

17. A method for the operation of a sealing assembly (1) for sealing a piston rod (2) of a piston compressor, which piston rod extends in the axial direction (A) and can be moved back and forth in the axial direction (A), wherein the sealing assembly (1) comprises at least one packing chamber (4) of a cylindrical shape and having a given inner radius, and wherein a magnetic spring device (9) comprising an electromagnet and at least one packing ring (78) are arranged in the packing chamber (4) one after the other in the axial direction (A), wherein the magnetic spring device (9) comprising two assemblies (9a, 9b) spaced apart in the axial direction, wherein at least one of the two assemblies (9a, 9b) is comprised of slideably interlaced ring segments inwardly biased by a spring element, and said at least one assembly has an outer radius smaller than the given inner radius such that it is elastically expandable radially outwards when said piston rod applies a radial force onto said at least one assembly, wherein the magnetic spring device (9) generates a mutually repelling spring force (F) acting in the axial direction (A), wherein a state variable of the piston compressor is measured and wherein the electromagnet is controlled in dependence on the state variable, in order to change in dependence on the state variable the spring force (F) which is applied by the magnetic spring device (9) on the packing ring (78).

18. The method as claimed in claim 17, characterized in that the rotational speed of the piston compressor is measured as the state variable, and that the spring force (F) is raised as the speed increases and is reduced as the speed decreases.

19. The method as claimed in claim 17, characterized in that the speed of the piston rod (2) is measured as the state variable, and the spring force (F) is raised as the speed increases and is reduced as the speed decreases.

* * * * *